(No Model.)  2 Sheets—Sheet 1.

B. B. TOYE.
TELEGRAPHY.

No. 454,630. Patented June 23, 1891.

Witnesses  Inventor (No Model.)　　　　　　　　B. B. TOYE.　　　　2 Sheets—Sheet 2.
TELEGRAPHY.
No. 454,630.　　　　　　　　　　　Patented June 23, 1891.

Witnesses　　　　　　　　　　　　　　　　Inventor
J. Edw. Maybee　　　　　　　　　　　　　Benjamin B. Toye
W. J. McMillan　　　　　　　　　　　　　by Donald C. Ridout & Co.
　　　　　　　　　　　　　　　　　　　　　　Attys.

UNITED STATES PATENT OFFICE.

BENJAMIN B. TOYE, OF TORONTO, CANADA.

TELEGRAPHY.

SPECIFICATION forming part of Letters Patent No. 454,630, dated June 23, 1891.

Application filed September 25, 1890. Serial No. 366,096. (No model.)

*To all whom it may concern:*

Be it known that I, BENJAMIN B. TOYE, telegrapher, of the city of Toronto, in the county of York, in the Province of Ontario, Canada, have invented certain new and useful Improvements in Telegraphy, of which the following is a specification, reference being had to the accompanying drawings, in which—

Figure 1:
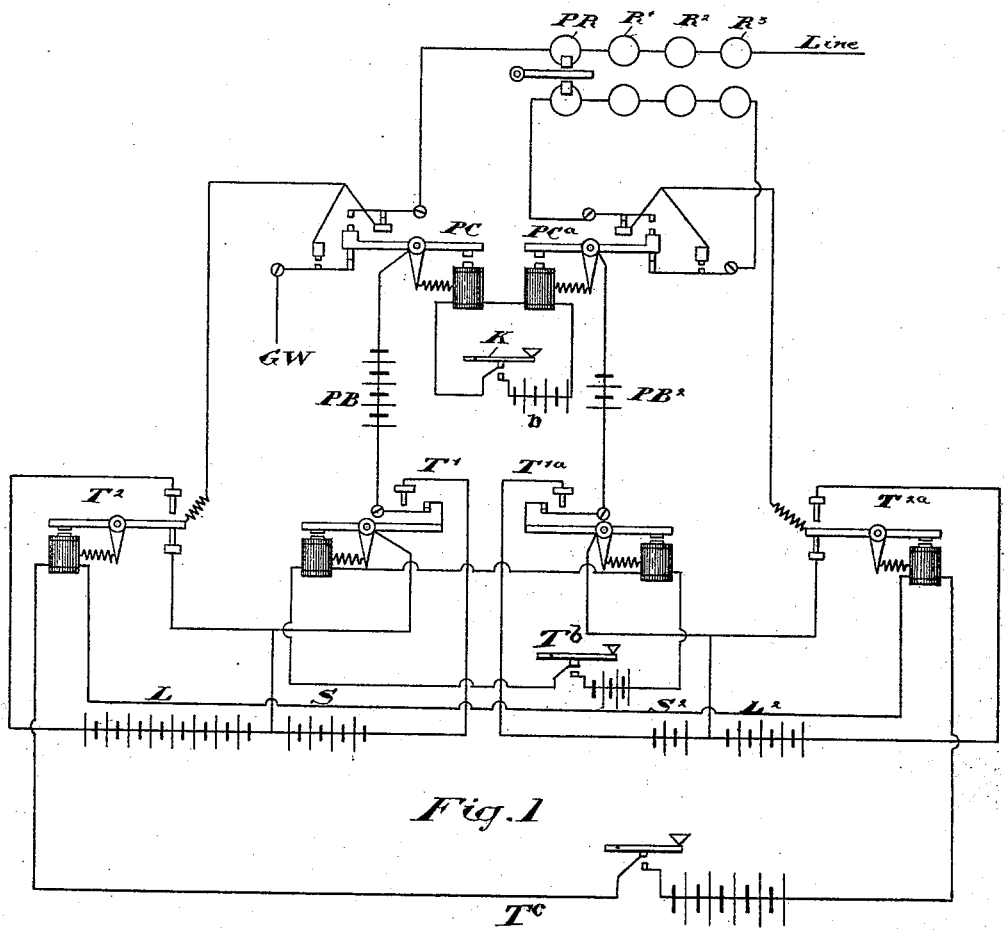
Figure 2:
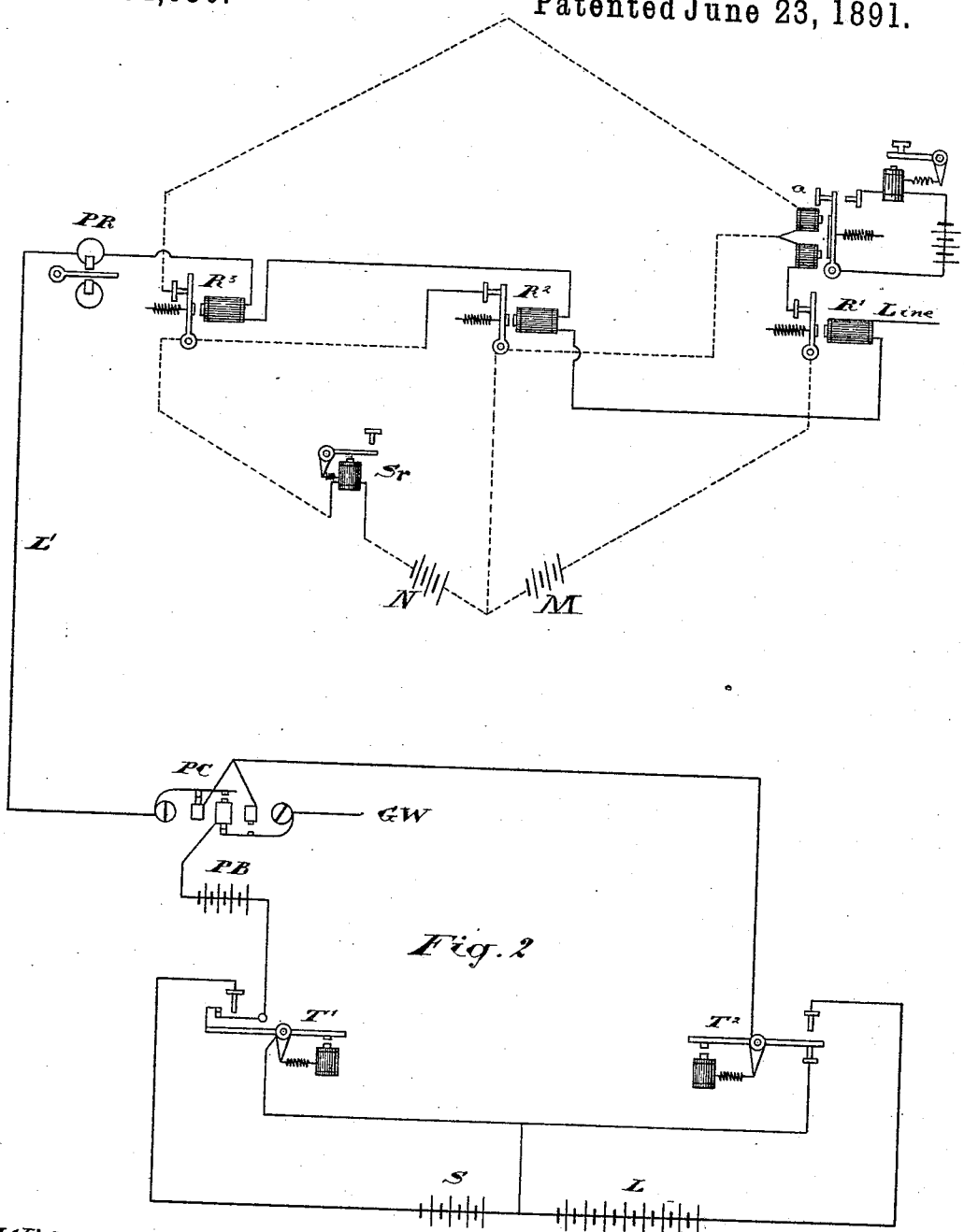

Figure 1 represents a view of my apparatus for sending the three sections of the main batteries to the actual line only. Fig. 2 represents a view of the main line, the polar relay, one side of the three duplex relays, the arrangement of the wires of the local-battery circuits, which include a repeating-sounder and a common single relay, the transmitting apparatus for the main batteries, which are one pole-changer, one continuity-preserving transmitter, and one break-before-make transmitter, and the three main-battery sections.

Similar letters and figures refer to similar parts in both Figs. 1 and 2.

My invention relates to improvements in duplex, quadruplex, and sextuplex telegraphy, more especially the latter, and to the apparatus connected therewith; and it consists in the peculiar construction, arrangement, and combinations of parts, hereinafter more particularly described, and then definitely claimed.

I will now describe Fig. 1 in detail. T' is an ordinary continuity-preserving transmitter, and its function is to send the weaker section S of main battery to line, hereinafter called the "short." T² is my break-before-make transmitter, and its function is to send the stronger section L of main battery to line, hereinafter called the "long." PC is an ordinary pole-changer, and PB is its section of main battery, which is always to line regardless of the position of T' and T². PR is an ordinary polar relay, and R', R², and R³ are three ordinary duplex relays. T'ª, T²ª, and PCª are duplicates of T', T², and PC. The key K sends the local battery $b$ through the magnets of PC and PCª simultaneously; and it is to be understood that the magnets of T' and T'ª are connected, as shown, in a similar manner to another key and local battery T², by which they will be operated simultaneously, and the same remark applies to T² and T²ª, in which Tᶜ represents the key and battery. It is obvious that when key K is depressed it will cause the pole-changer PC to reverse whatever main battery may at the moment be to line in the usual way, and that its duplicate pole-changer PCª will simultaneously do the same for whatever local battery may at the moment be in the local circuit, and that in like manner when T' and T'ª are depressed by their joint key and battery the former will send the weaker main battery S to line through one portion of the coils of all the duplex relays, and the latter will send the section S² of the local batteries through the other portion of the coils of the said duplex relays and around the local circuit, and in like manner T² and T²ª will send the stronger batteries L and L² *via* the same routes. Thus it will be readily understood that the whole strength of the various sections of main batteries are sent to main line only and are counteracted on the home relays by local batteries sent simultaneously around a local circuit. A few cells of local battery in the local circuits will of course be sufficient to counteract the effect of the powerful main-batteries in the main circuit. The advantage of this system is that whereas when the main-battery power is divided as heretofore the difficulty of maintaining a proper potential to line is a great drawback, and necessitates the use of expensive low-resistance line-conductors to partially obviate this difficulty, for as the actual potential to line is the potential passing the joint lines, the result is that in wet and damp weather sufficient current to operate the second and third sides often fails to arrive at the receiving end. By sending the whole potential to line this defect is remedied. I have shown the transmitters in duplicate, but single sets will answer the purpose if fitted up with double sets of springs. The object of using the break-before-make transmitter T² is that as this transmitter always operates two relays at a time by means of the "long" section of main battery L it is essential that their armatures shall respond both forward and backward in a perfectly synchronous manner; and this I have discovered it is very difficult to get them to do when a continuity-preserving transmitter is used for this transmitter because of the tendency of armature of relay $R^2$ to remain on its front stop when, "short" being to line, "long" is added and then withdrawn, it being liable to be retained by the strength of "short," because it requires less strength to hold an armature on its forward stop when there than to attract it from its back-stop. The break-before-make transmitter prevents this tendency by momentarily taking off all battery which may be to line while its armature is passing from its bottom to its top stop-piece, and thus causes armature of relay $R^2$ to return promptly to its back-stop, by momentarily releasing it from the attraction of "short."

I will now describe Fig. 2: PR is the same polar relay, and $R'$ $R^2$ $R^3$ are one coil of each of the same three duplex relays shown in Fig. 1. M and N are ordinary local batteries. $Sr$ is an ordinary repeating-sounder. $a$ is an ordinary single-wire relay with its magnets electrically divided, so that it is practically two relays controlling one armature at different times. The pole-changers and transmitters are the same as those sending the main-battery currents in Fig. 1, and act in the usual way, except that $T^2$ breaks one contact before making another, as before described, and preferably makes contact with two solid points instead of springs. The continuous lines represent the main, and the broken lines the local, circuit wires.

Suppose for clearness of explanation that the transmitting apparatus is at one end of a line and the receiving apparatus at the other, and that $L'$ is the line-wire between them, though of course both are required at each end in actual work, and that the wire W is connected to ground to complete the circuit.

The duplex relays are shown as single ones to avoid a multiplicity of wires, and are mentioned as such; but it will be understood that they work in practice as duplex relays in the ordinary well-known way. Relay $R'$ is adjusted to respond to the weaker section of main battery, called the "short"—that is, the shorter end. Relay $R^2$ is adjusted to respond to the stronger section of main battery, called the "long"—that is, the longer end— and relay $R^3$ is adjusted to respond only to both combined. The pole-changer PC reverses the battery to line in the usual way. It will be seen by the drawings that local battery M operates the lower magnet of relay $a$ only, and that local battery N alternates between its sounder $Sr$ and the upper magnet of relay $a$, according to the position of the armature of $R^2$. When the armature of $R^2$ moves forward, battery N is released from its own proper circuit and now goes via the upper magnet of relay A, thence via the wire to the back-stop of $R^3$ and its armature to and through sounder $Sr$ to its other pole. All these three relays close the local circuits on their back-stops, and thus do not affect their sounders by the reversals of the pole-changer.

I will now suppose that all three relay-armatures are on their back-stops, as shown in the drawings, owing to "short" and "long" both not being to line. Battery M now holds relay $a$ closed through its lower magnet, and battery N holds sounder $Sr$ closed. If "short" alone be now sent to line, only the armature of relay $R'$ responds and relay $a$ opens; but, if instead of "short," "long" alone be sent to line, the armatures of both relays $R'$ and $R^2$ and sounder $Sr$ open; but relay $a$ does not, because as battery M is being shut out of the lower magnet battery N is being turned in the upper one, it being released from its own proper circuit by $R^2$ opening, and it now goes via the armature of $R^3$ and the upper magnet of relay $a$ back to its other pole. "Long" being now to line, if "short" be added, armature of $R^3$ responds, and by cutting battery N off from the upper magnet of relay $a$ it opens. Next, when "short" alone is to line, causing the armature of relay $R'$ to move forward, opening relay $a$ by taking battery M off, and "long" is now added, armatures of relays $R^2$ and $R^3$ respond; but though the armature of $R^2$ releases battery N, as before, the armature of relay $R^3$ at the same time cuts it off from the upper magnet of relay $a$, and it remains open and sounder $Sr$ only responds.

The object of having relay $a$ in the local circuit instead of an ordinary repeating-sounder is so that its high resistance will cause sounder $Sr$ to respond by the said high resistance being thrown into the alternative circuit when the armature of relay $R^2$ opens.

It will readily be understood by experts that when all three relays are on their back-stops no current from N will go via the alternative route through the upper magnet of relay $a$, because after passing through sounder $Sr$ it has no resistance to encounter in returning to its other pole via the armature of $R^2$. If, however, a very high resistance relay be used for relay $a$ sounder $Sr$ may be placed between the back-stop of relay $R^2$ and the armature of $R^3$, so that the circuit of sounder $Sr$ will be broken by relay $R^2$ instead of having the resistance thrown in, because, although battery N will then divide *pro rata* between sounder $Sr$ of four ohms and the upper magnet of relay $a$—say three hundred ohms—so very little current will go by the latter route that it may be ignored.

To make the description of the relays $R'$, $R^2$, and $R^3$ and the sounders they operate plainer it may be stated: First, transmitter $T'$, when closed, alone sends battery S to line and operates relay $R'$, which in turn operates relay $a$ through its lower magnet. Second, transmitter $T^2$, when closed, alone sends battery L to line, which operates relays $R'$ and $R^2$, the latter of which in turn operates the sounder S. Battery N, at the same time being released from its own proper route, now goes via upper magnet of relay $a$ and keeps its armature closed, so that it gives no signal notwithstanding that relay R' is open. Third, transmitter T' and T², when closed, together send back batteries S and L and operate all three relays R', R², and R³, and they in turn operate sounder S and relay $a$. Thus two separate messages are sent in the same direction by increasing the battery strength, and a third one may be sent at the same time by reversing the polarity of batteries in the usual well-known way.

When both main batteries S and L are sent to line simultaneously, all three relays respond to their combined strength, their armatures all move forward, and then the following results take place: Relay R' takes battery M off the lower magnet of relay $a$, relay R² takes battery N off sounder S$r$, relay R³ takes battery N off the upper magnet of relay $a$. Thus, all battery being taken off, sounder S$r$ and off both upper and lower magnets of relay $a$, both sounder S$r$ and relay $a$ respond. I will now explain the various functions of this local-battery "bridge," which are as follows: First, when both "short" and "long" sections of main battery are off the line, all three relay-armatures will be on their back-stops, and the following effects will take place: Local battery M will go via the lower magnet of relay $a$ back to its other pole and keep armature of relay A attracted; also, local battery N will follow its circuit through sounder S$r$, via armature of relay R³, thence to back-stop and armature of relay R², thence back to its other pole, no current going via the back-stop of relay R³ and upper magnet of relay $a$, as might be supposed, because the magnet of relay $a$ is at least twenty times the resistance of the sounder.

It should be remembered that local battery N is operating sounder S$r$, and local battery M is operating relay $a$ through the lower magnet, and there is no current in the upper magnet of relay $a$. Now then, first, supposing "short" to be sent to line, only relay R' will respond, (it being adjusted to be the weakest,) and its armature taking local battery M off the lower magnet of relay $a$ it will respond; second, now next suppose that instead of "short" being sent to line "long" is sent, relay R² will respond, (being adjusted the next strongest to relay R',) and relay R' will also respond, but relay $a$ will not, because as local battery M is taken off the lower magnet of relay $a$ at the same instant local battery N goes through the upper magnet, being released from its own proper route and now going through sounder S$r$ to the armature of relay R³, thence via the back-stop and the wire to the upper magnet of relay $a$, thence to the armature of relay R², thence back to the other pole of the battery, and so sounder S$r$ opens, but relay $a$ remains closed, being held by the current from local battery N through its upper magnet; third, now, "long" being to line and armatures of relays R' and R² being forward, and armature of relay $a$ being held on its front stop by local battery N, if "short" be also sent to line, R³ responds and cuts battery N off from the upper magnet of relay $a$ and it responds. Now, suppose "short" is sent first and "long" is then added, reversing the order previously noted. When "short" is sent to line, relay R' responds, taking battery M off relay $a$ and it responds. Then "long" is sent to line and both relays R² and R³ respond. The former would divert battery N through the upper magnet of relay $a$, as before, only that a relay R³ opens at the same instant it breaks the circuit to it and relay $a$ remains open, as it was before "long" was sent to line.

The advantages and improvements may, broadly, be said to be the doing away with all extra hooks, springs, and other appliances on the three relays; the use of simple currents as at present used in the quaduplex system in contradistinction to part rhythmical, vibratory, or induced currents; the use of a break-before-make transmitter in conjunction with one continuity-preserving and one pole-changing transmitter; the use of the electrical bridge for the local-battery circuits, by which one relay is operated alternately by two local batteries, so that the said relay sometimes responds to relay R' and sometimes does not, and sometimes responds to relay R³.

It may perhaps be thought that the arrangement above described will cause one of the keys to continuously break in upon the message sent by the other, and thus interfere with the intelligibility of the signals. This is not so, and the reason is that the play between the two points is so small—about the same as a relay-armature—that it does not open the circuit longer than the ordinary transmitter does, while it short-circuits battery L in the quadruplex system, as of course while the battery is so short-circuited no current from it goes to line. The time in both cases is so infinitesimal as not to be noticeable.

What I claim as my invention is—

1. In a main-line circuit, one pole-changer arranged to reverse the currents in the usual way, in combination with one continuity-preserving transmitter and one break-before-make transmitter arranged to send currents of different intensities in the same direction, substantially as and for the purpose specified.

2. In a main-line circuit, the combination of a pole-changer, three simple duplex relays arranged to close their local circuit on their back-stops, a repeating-sounder, a repeating-relay with divided magnets acting as two relays with but one armature, and two local batteries, one of which alternates between two circuits, substantially as and for the purpose specified.

3. In a main-line circuit, a sending-instrument arranged to reverse the battery-current, a sending-instrument arranged to act as an ordinary continuity-preserving transmitter, and a sending-instrument arranged as a break-before-make transmitter to throw in a battery of a greater strength, in combination with a receiving-instrument arranged to be affected by the reversal of a battery-current, and two receiving-instruments, one being affected by a battery-current of greater strength than the other, substantially as and for the purpose specified.

Toronto, September 2, 1890.

BENJAMIN B. TOYE.

In presence of—
JOSEPH JACKES,
G. H. JACKES.